United States Patent [19]

Lupke et al.

[11] Patent Number: 5,605,083
[45] Date of Patent: Feb. 25, 1997

[54] PIPE CUTTING APPARATUS WITH DIFFERENTIAL SPEED ROTATABLE RING CUTTER ACTUATION

[76] Inventors: Manfred A. A. Lupke, 92 Elgin Street, Thornhill, Ontario, Canada, L3Y 1W6; Stefan Lupke, 32 Vintage Lane, Thronhill, Ontario, Canada, L3T 1Z6

[21] Appl. No.: 419,413

[22] Filed: Apr. 10, 1995

[51] Int. Cl.⁶ .............................. B23B 5/14; B23B 5/08
[52] U.S. Cl. .................................................. 82/67; 82/113
[58] Field of Search ................................. 82/61, 62, 64, 82/65, 67, 130, 72, 73, 74, 113

[56] References Cited

U.S. PATENT DOCUMENTS 2,905,243  9/1959  Rodder ................................ 82/61
3,807,047  4/1974  Sherer et al. ........................ 82/113

*Primary Examiner*—M. Rachuba
*Assistant Examiner*—Kenneth J. Hansen

[57] ABSTRACT

A pipe cutting apparatus comprises a housing with a pipe passage through the housing, a rotatable collar and a rotatable ring both of which rotate about the pipe passage and a pipe cutter mounted on the collar. The pipe cutter is movable inwardly toward and outwardly away from the pipe passage and has a drive gear which engages the ring such that differences in rotating speeds between the collar and the ring operate the drive gear to produce movement of the pipe cutter.

1 Claim, 8 Drawing Sheets

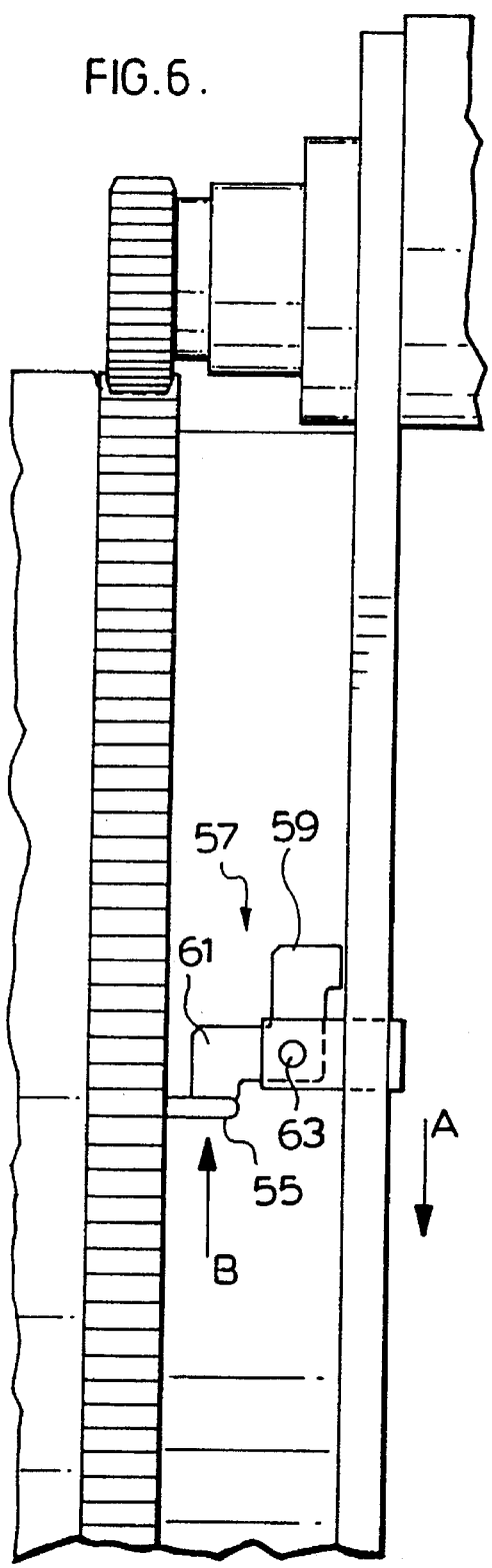
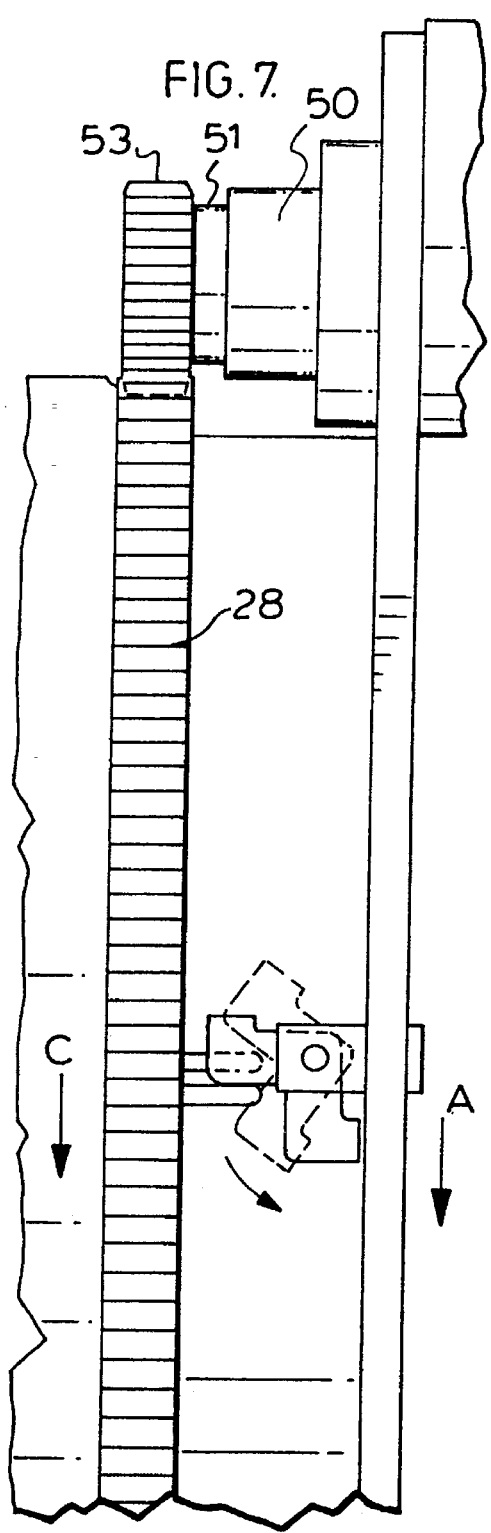

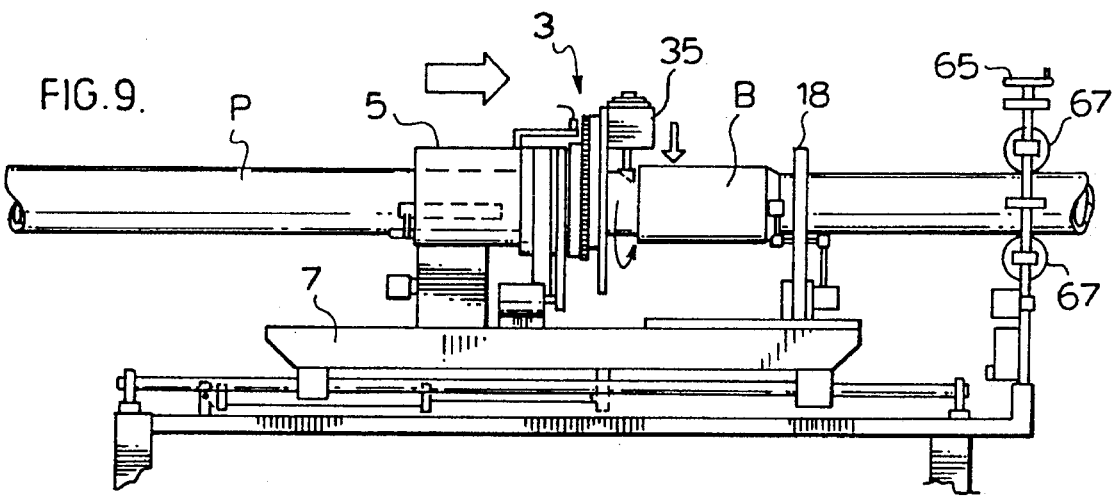
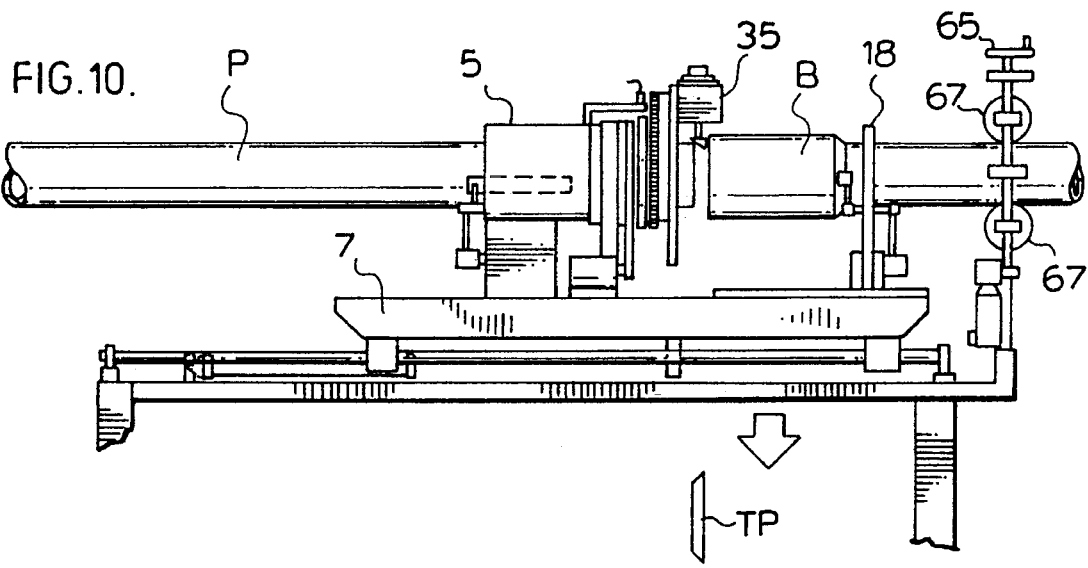

PIPE CUTTING APPARATUS WITH DIFFERENTIAL SPEED ROTATABLE RING CUTTER ACTUATION

FIELD OF THE INVENTION

The present invention relates to a pipe cutting apparatus which is particularly useful for the cutting of pipe coming off of an extruder.

BACKGROUND OF THE INVENTION

There are currently available different types of pipe cutters including those which cut pipe as it is moving off of an extruder. These cutters are typically in the form of a saw or a knife operated through hydraulic pistons or having a drive directly from an electric motor. In the case of hydraulically operated cutters seal problems resulting in fluid leakage can occur. In the case of cutters operated by means of an electric motor which pushes the cutter in and pulls the cutter out, it as difficult while the pipe is moving to adjust the in and out speed of the cutter relative to the pipe.

SUMMARY OF THE INVENTION

The present invention provides a pipe cutting apparatus which does not suffer from hydraulic fluid leakage problems and further which is very easily controlled through a simple yet efficient mechanical gear drive.

More particularly, the pipe cutting apparatus of the present invention comprises a housing with a pipe passage through the housing, a rotatable collar and a rotatable ring both of which rotate around the pipe passage and a pipe cutter mounted on the collar. The pipe cutter is movable inwardly towards and outwardly away from the pipe passage and has a gear drive which engages the ring such that differences in rotating speeds between the collar and the ring operate the gear drive to produce movement of the pipe cutter.

In accordance with the present invention, it is very easy to produce differences in the rotational speeds between collar the ring in order to adjust the in and out speed of the cutter relative to the pipe. Furthermore, no hydraulic pistons and associated seals and fluids are required to operate the apparatus.

BRIEF DESCRIPTION OF THE DRAWINGS

The above as well as other advantages and features of the present invention will be described in greater detail according to the preferred embodiments of the present invention in which;

FIGS. 6 and 7 are enlarged side views of the connection between the actual pipe cutter and the gear ring of the apparatus of FIG. 1;

FIGS. 9 and 10 show different sequences of operation of the pipe cutting apparatus shown in FIG. 8.

DETAILED DESCRIPTION ACCORDING TO THE PREFERRED EMBODIMENTS OF THE PRESENT INVENTION

Figure 8:
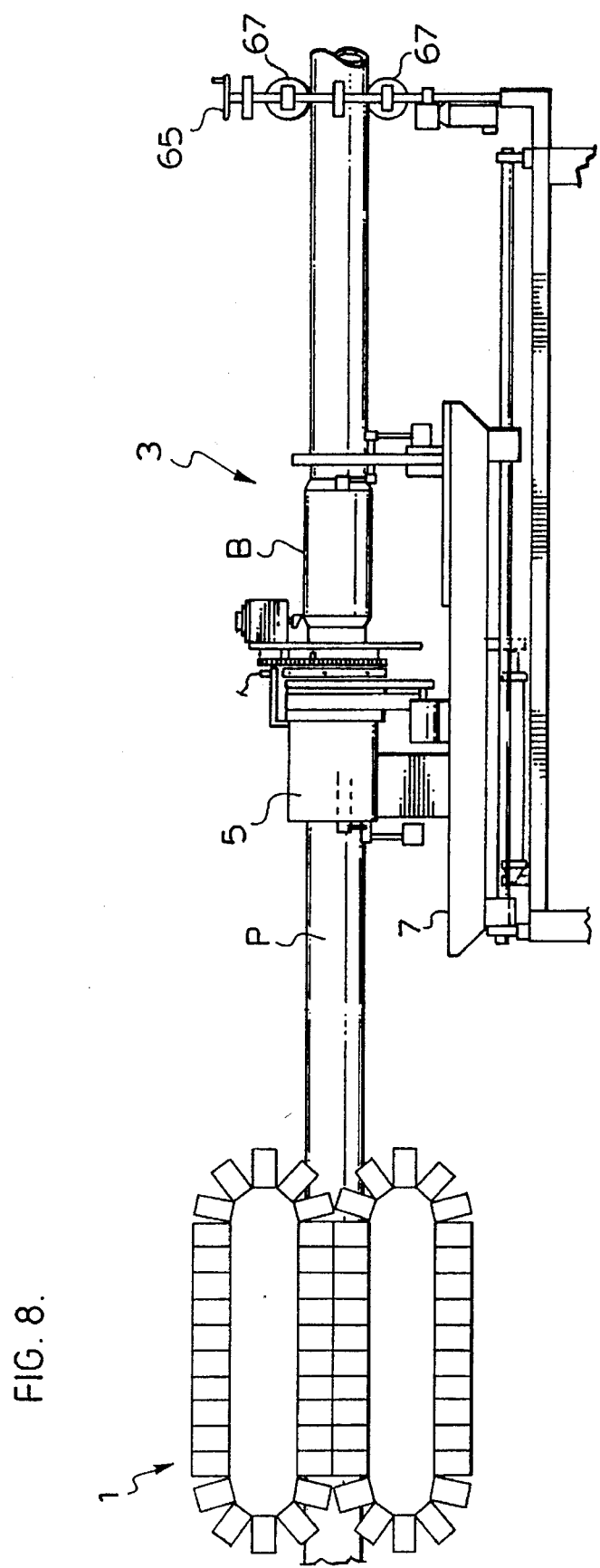
FIG. 8 is a side view of pipe coming off of an extruder to the pipe cutting apparatus of FIG. 1.

FIG. 8 of the drawings shows a pipe extruder generally indicated at 1 which feeds pipe P to a pipe cutting apparatus generally indicated at 3. The pipe will pass through other equipment such as a pipe sizer and the like which are not shown, before reaching the pipe cutting apparatus. This pipe cutting apparatus includes a cutter 35 which cuts into the pipe to produce separate pipe sections as the extruder continues to feed pipe to the pipe cutting apparatus. Accordingly, production from the extruder does not have to be slowed down in order to cut the pipe.

Figure 1:
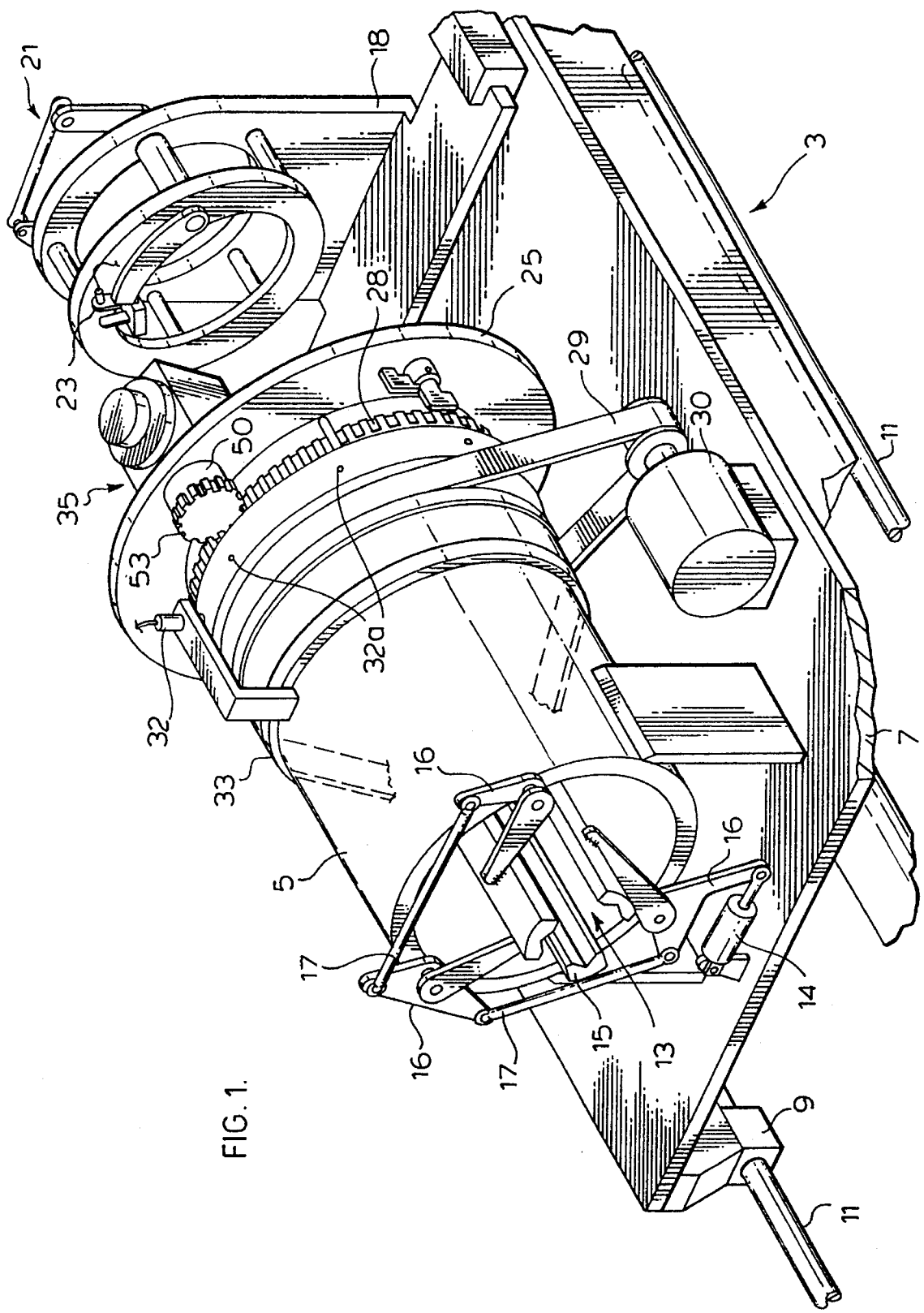
FIG. 1 is a rear perspective view looking down on a pipe cutting apparatus according to a preferred embodiment of the present invention.
Figure 2:
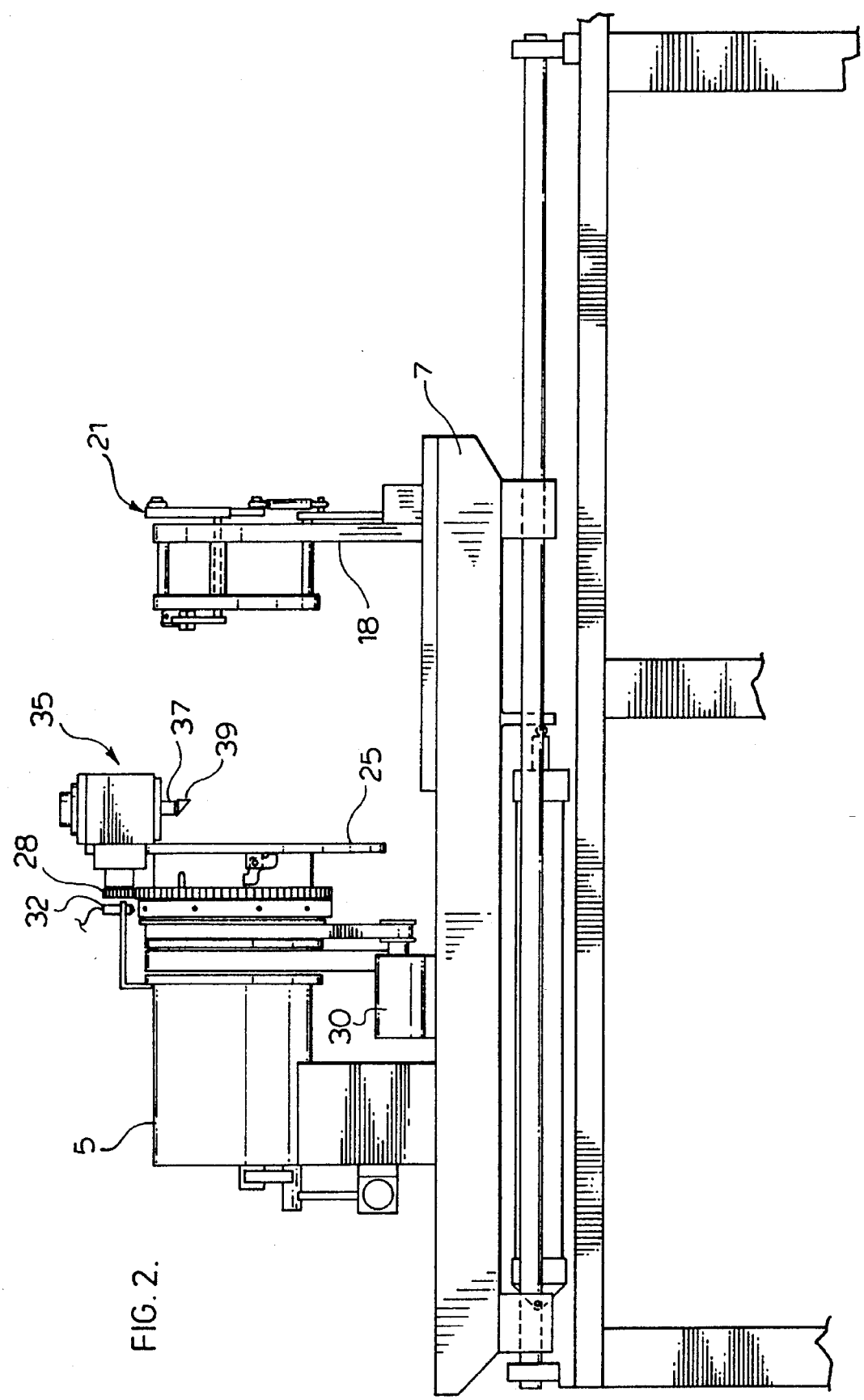
FIG. 2 is a side view of the pipe cutting apparatus of FIG. 1.

The pipe cutting apparatus 3 is better shown in FIG. 1 of the drawings. It comprises a main substantially hollow and generally cylindrical housing 5. This housing is supported by a platform 7 which is in turn supported on feet 9 slideably mounted on guide rods 11. A control device which is not shown causes platform 7 with the housing 5 mounted thereon to slide along the guide rails as described later in detail.

Housing 5 is provided with a center opening generally indicated at 13. This opening provides a pipe passage through the housing. Pipe supports 15 are provided interiorly of the housing around the pipe passage. These supports open and close relative to one another through operation of a piston 14 which controls movement of pivotal plates 16 and associated linkage bars 17. The supports 15 are moved through the plates and linkage bars to clamp onto the pipe to center the pipe in the passage and to prevent it from shifting radially within the pipe cutting apparatus during the actual cutting of the pipe.

Provided down stream of the main housing 5 is a further smaller housing 18. This housing also includes a center pipe passage with a series of pipe supports or clamps which are moved to and from the clamping position by a linkage control generally indicated at 21. A sensor 23 is provided around the pipe passage of housing portion 18. This sensor, which could be located at any of numerous different positions in the apparatus, senses the position of the pipe in the apparatus which in turn dictates when the pipe is to be cut. In the particular case shown, pipe P includes bells such as bell B along its length and sensor 23 senses when the bell is approaching the housing 18 to initiate operation of the actual pipe cutter generally indicated at 35.

Figure 3:
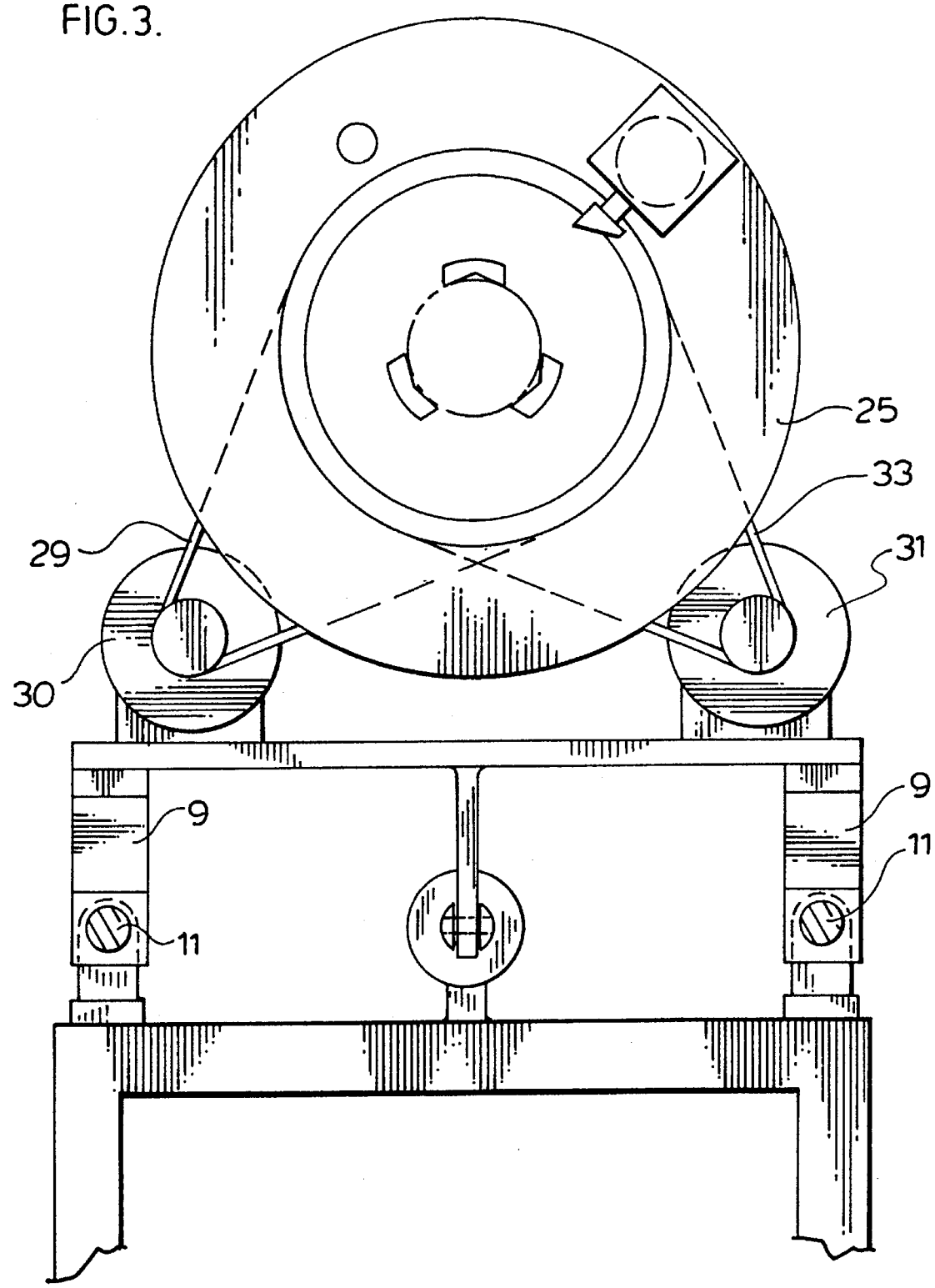
FIG. 3 is a sectional view of the pipe cutting apparatus along the lines 3—3 of FIG. 1.
Figure 4:
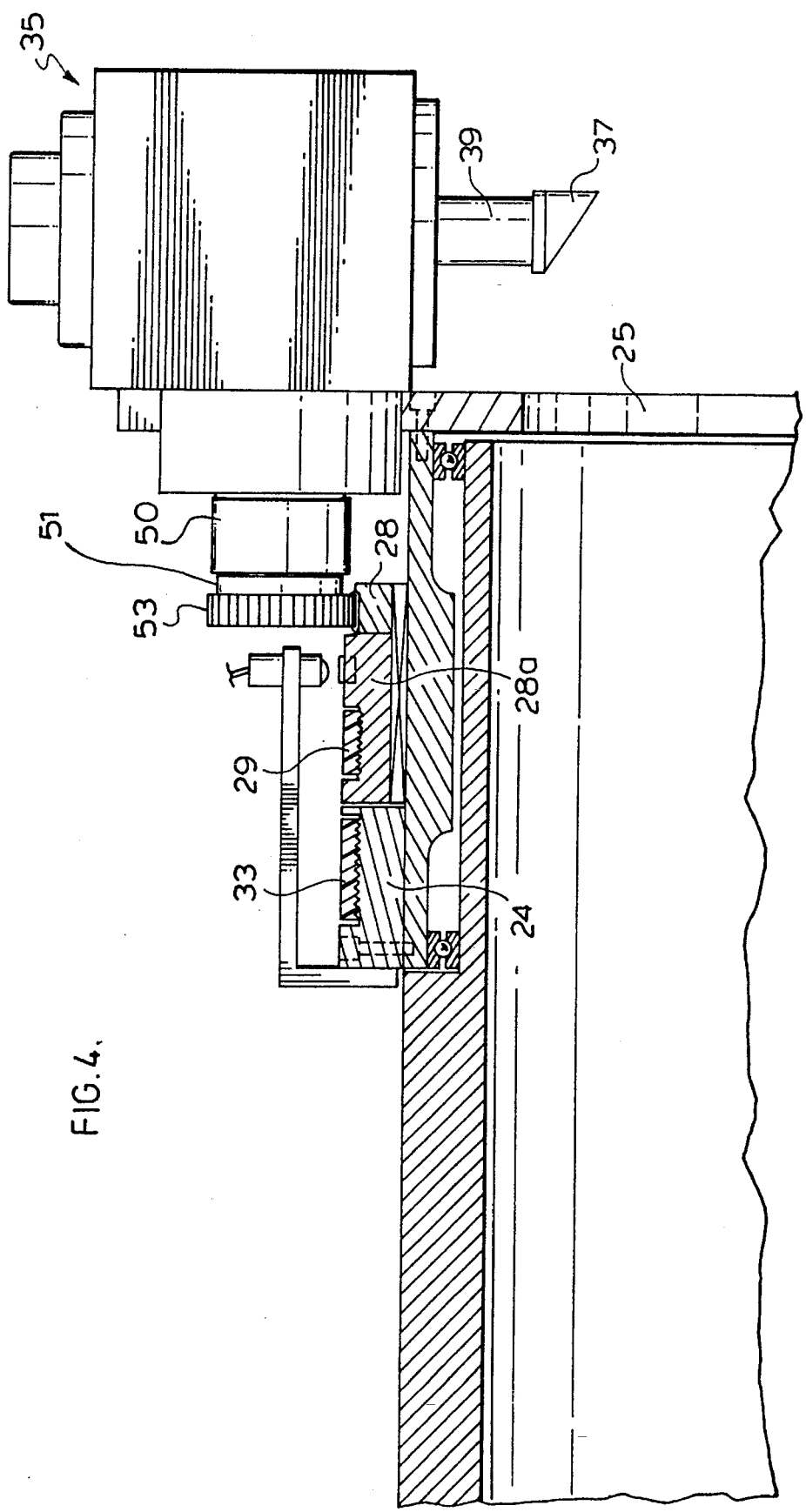
FIG. 4 is an enlarged side view of the actual pipe cutter from the apparatus of FIG. 1.

Provided on the downstream end of housing 5 is a collar 25 having a collar barrel 25a which is held to the collar by a pin P1. The actual cutter is mounted on this collar. The collar barrel has a center opening and is rotatable about the pipe passage. The actual rotation of collar 25 is provided by a means of a motor 31 and a drive belt 33 shown in FIG. 3 of the drawings. Drive belt 33 wraps around an extension 24 which is held with the collar barrel by a pin P2 as seen in FIG. 4 of the drawings.

As the collar rotates, cutter 35 orbits around the pipe passing through the center pipe passage of the apparatus.

Referring again to FIG. 1 a ring 28 which is located beside collar 25 also rotates around the pipe passage. This ring which has a geared surface as shown is moved in one of two ways. It can either be pushed around by the collar in which case the ring and the collar move at the same rotational speed with one another, or it can be separately driven by a motor 30 which operates a pulley 29 wrapping around barrel portion 28a extending from the ring 28. Barrel portion 28 is separated from collar barrel 25a by a bearing sleeve BS.

From a general concept standpoint, cutter 35 is inoperative as long as collar 25 and ring 28 are either both stationary or moving at the same speed as one another. If however ring 28 is moving at a different speed than collar 25, cutter 35 begins to operate to either force blade 37 into the pipe or to retract the blade relative to the pipe.

Figure 5:
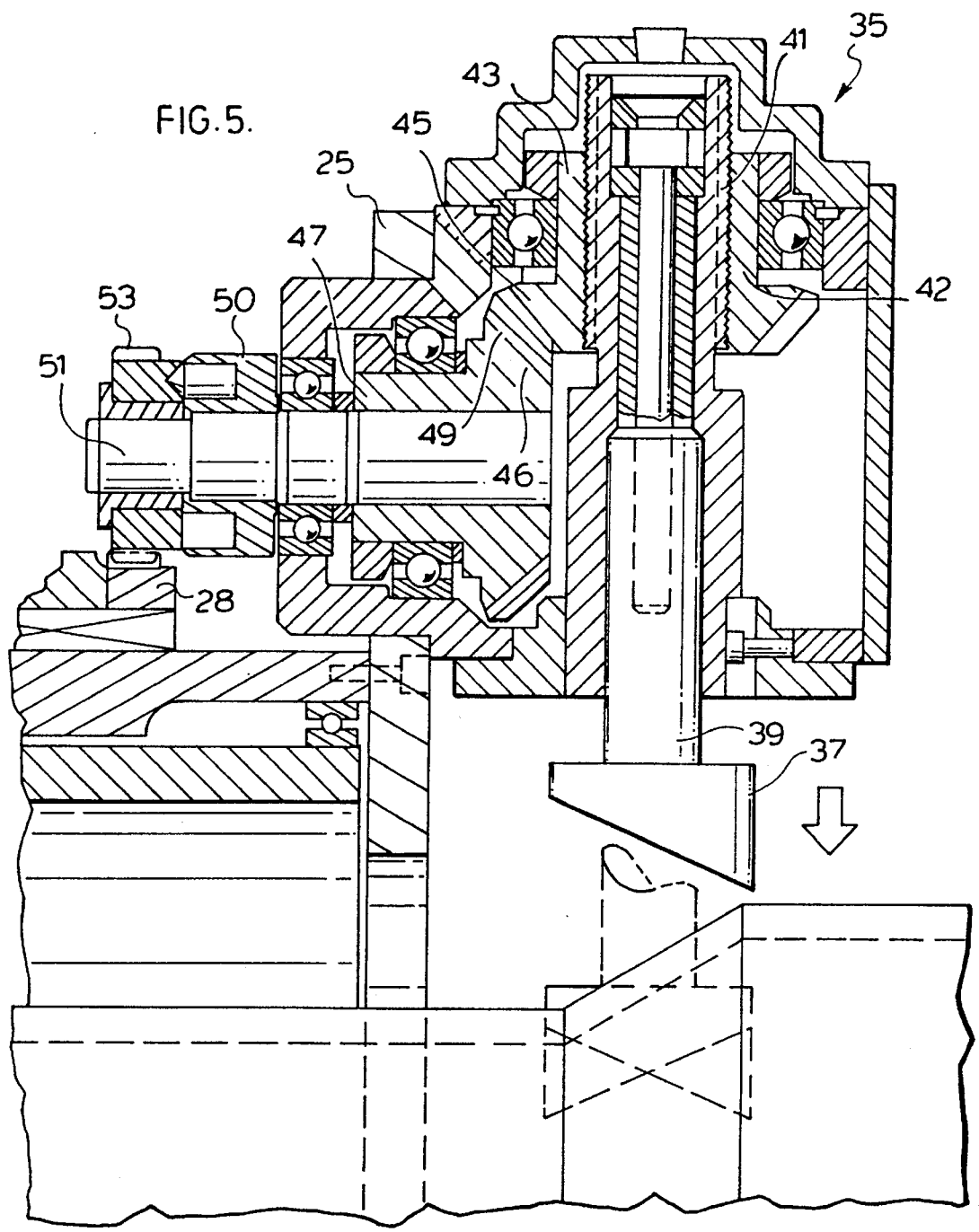
FIG. 5 is an enlarged sectional view through the actual pipe cutter of FIG. 1.

In order to better explain its operation, details of the cutter are described in reference to FIG. 5 of the drawings. Here it will be seen that blade 37 is mounted on an arm 39 which reciprocates in and out of the main housing of the cutter. Arm 39 has a threaded end 41 interiorly of the housing which meshes with a threaded collar 43 on a gear 42. Gear 42 includes a bevelled gear face 45 which meshes with a bevelled gear face 49 of a further gear 46. Gear 46 includes a sideways extending collar 47 with a shaft 51 being journalled in the collar. This shaft passes through an exterior housing 50 and has an outer end gear 53 secured to the shaft. Gear 53 meshes with the exterior geared surface of ring 28.

As long as the ring and collar which carries the cutter do not move relative to one another, the gear drive for blade 37 is not activated, however once there is relative movement between the collar and the ring, shaft 51 carrying gear 53 is rotated by the gears ring 28 which in turn causes rotation of gear 46. The rotation of gear 46 causes rotation of gear 42 which is threadably engaged with arm end 41 to move the cutter arm. The direction of movement of arm 39, i.e. either in or out of the cutter housing is dependent upon the direction of the threads meshing between the upper end 41 of the arm and gear 42 and whether or not the ring is rotating faster or slower than the collar.

In the particular example shown, arm 39 and cutter head 37 are pushed out of the main cutter housing towards the pipe when the ring is rotated faster than the collar and the cutter is retracted when the rotation of the ring is slower than than of the collar. Furthermore, in accordance with this preferred embodiment, when the cutting motion is first initiated, the ring is rotated much faster than the collar to quickly drive the arm and the cutting head towards the pipe and as soon as the cutting head reaches the pipe, the speed of the ring slows down but remains faster than that of the collar to drive the cutting head while it is rotating around and into the pipe at a slower speed than that at which it initially approached the pipe. After the cut has been completed, the speed of ring is decreased to something less than that of the speed of the collar to retract arm 39 and pull the cutting blade away from the pipe.

The actual operation of motor 30 is determined by an electronic controller which is not shown and which can easily be adjusted according to different parameters of the cutting operation such as thickness of the pipe walls, etc.

A pulse counter 32 is provided to sense rotational speed of the ring. The barrel 28a of the ring is provided with spaced apart pick up points 32a which pass beneath the counter and the counter feeds speed of the ring back to the controller according to the rate of pulses produced by the pick up points passing by the counter.

In this particular embodiment, arm 39 of the cutter becomes fully extended in two revolutions of the ring relative to the collar in a first direction and is fully retracted in two revolutions of the ring relative to the collar in a second opposite direction. Furthermore, specific limit controls are provided to ensure that the ring does not rotate in either direction more than two revolutions relative to the collar. These limit controls are best described having reference to FIGS. 1, 6 and 7 of the drawings.

More particularly, ring 28 is provided with a pin 55 which extends towards the collar. The collar is provided with a movable bracket generally indicated at 57 facing the ring. This bracket includes a pair of arms 59 and 61 fixed at right angles to one another. The two arms are mounted to the collar by a pivot connection 63.

FIG. 6 shows the collar as it is rotated in the direction of arrow A. In the FIG. 6 position, the ring is being rotated with the collar by the contact of arm 61 on pin 55. Note that arm 59 is directly against the back of the collar so that the two arms cannot move out of their respective positions as long as the pin 55 pushes on the arm 61 in the direction indicated by arrow B. This will of course occur as long as the collar is rotating the ring. When this happens, there is no need to run the motor 30 because the ring is being moved around by the collar.

FIG. 7 shows a situation in which the ring 28 has been sped up by motor 30 in the direction of arrow C. In fact in FIG. 7, the ring has sped ahead by a complete revolution relative to the collar. Here it will be seen that the pin 55 has initially pulled away from and then caught back up to the arm 61. It strikes the arm 61 on the side opposite that against which the pin was held in the FIG. 6 position and pushes the arm 61 out of the way to continue its rotation. By virtue of the pin pushing on arm 61, arm 59 moves to the solid line position shown in FIG. 7 so that when the pin once again catches up with the two arms, it will now run into arm 59 which is not allowed to move any further because of the interference provided by the collar on arm 61. As noted above, all of this occurs in two revolutions of the ring relative to the collar.

The above relative movement is used to provide a full extension of arm 39 to the cutting position and a full retraction of the arm is achieved by two complete revolutions of the ring relative to the collar in the opposite direction. Pin 55 will pull away from arm 59 and after one revolution knock the two arms back to the FIG. 6 position and on the second revolution the pin itself will return to the FIG. 6 position.

The position of pin 55 relative to the two arms 59 and 61 is fed back to the controller to ensure that once the pin is in either one of its two stopped positions motor 30 is controlled to ensure that the ring will not try to go beyond the stop position.

One of the advantages provided by the control system described immediately above is that it is very simple to ensure that the ring and the collar are set at a zero position relative to one another, vis-a-vis the cutter, and to further ensure that they rotate at the same speed with one another when there is no cutting operation required.

It is to be appreciated that although this embodiment shows a full cutting operation and a complete retraction of the blade in two revolutions of the ring relative to the collar other relative rotational differences could equally as well be used.

Referring now to FIGS. 8 through 10 it will be seen that a pipe puller 65 is provided at the farthest downstream end of the overall apparatus. This pipe puller includes gripping wheels 67. After the pipe has been cut to produce a pipe section separated from the pipe coming off of the extruder, wheels 67 grip on the separated pipe section and accelerate it away from the rest of the pipe.

As will be seen particularly well in FIG. 5 of the drawings, cutting head 37 of the cutter has a widened head to produce a relatively wide cut. The material at the actual cut is referred to as a transition piece which falls from the pipe to a collecting bin or the like when the separated section of the pipe is pulled away as shown for example in FIG. 10 of the drawings. In the particular example shown, the transition piece is between the main body of the pipe and the bell and the pipe so that these two can be telescopically coupled back with one another as is known in the art.

The operation of the overall apparatus is best described having reference to FIGS. 1 and 8 through 10. The pipe P coming off the extruder 1 is fed to the pipe passage 13 in housing 5. The supports or clamps 15 are spread sufficiently wide to allow the bell B of the pipe to pass through the housing. The housing on its sliding platform 7 remains stationary before any cutting is required.

Once the bell B clears through the housing 5 and reaches the housing 18, sensor 23 senses its approach to initiate the cutting operation. At this point, supports 15 clamp on the pipe behind the bell and the clamps controlled through mechanism 21 on housing 18 clamp on the pipe body in front of the bell. This stabilizes the pipe against radial shifting. At the same time, housing 5 on its sliding support 7 begins to slide downstream with the movement of the pipe off of the extruder. Also, motor 30 is started up to rotate the geared ring 28 which meshes with the geared end 53 of cutter 35. Collar 25 is also rotated by motor 31 causing the cutter to orbit around the pipe. However, the geared ring and the cutter are rotated at different speeds and in this case, the geared ring is rotating faster than the cutter. This causes the arm 39 of the cutter carrying the cutting blade 37 to move down into the pipe while it is circling the pipe to provide a full cut around the pipe resulting in transition piece TP. Once the cut has been completed, the speed of the gear ring is slowed relative to the speed of the collar to retract arm 39 carrying the the cutting blade. As soon as the cutting blade has been fully retracted and once the downstream pipe section has been pulled away by the puller 65, all of the support clamps on the pipe body are released and the main housing of the apparatus is slid back upstream where it is ready for the next cutting operation.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. Pipe cutting apparatus comprising a housing with a pipe passage through said housing, a rotatable collar and a rotatable ring both of which rotate about said pipe passage and a pipe cutter mounted on said collar, said pipe cutter being movable inwardly toward and outwardly away from said pipe passage and said pipe cutter having a gear drive which engages said ring such that differences in rotating speeds between said collar and said ring operate said gear drive to produce movement of said pipe cutter, said pipe cutter being stationary when said collar and said ring rotate at the same speed with one another, said apparatus including a first motor which rotates said collar and a second motor which, when active, rotates said ring, said ring being rotated by said collar when said second motor is inactive, wherein the collar includes a catch and the ring includes a pin which engages the catch, and the catch being movable by said pin between a movable and blocking position when said ring is rotating at a different speed than said collar.

* * * * *